Nov. 4, 1947.  J. A. HATTON ET AL  2,430,015
UTILIZATION OF POWDERED CATALYSTS
Filed Aug. 21, 1945  2 Sheets—Sheet 1
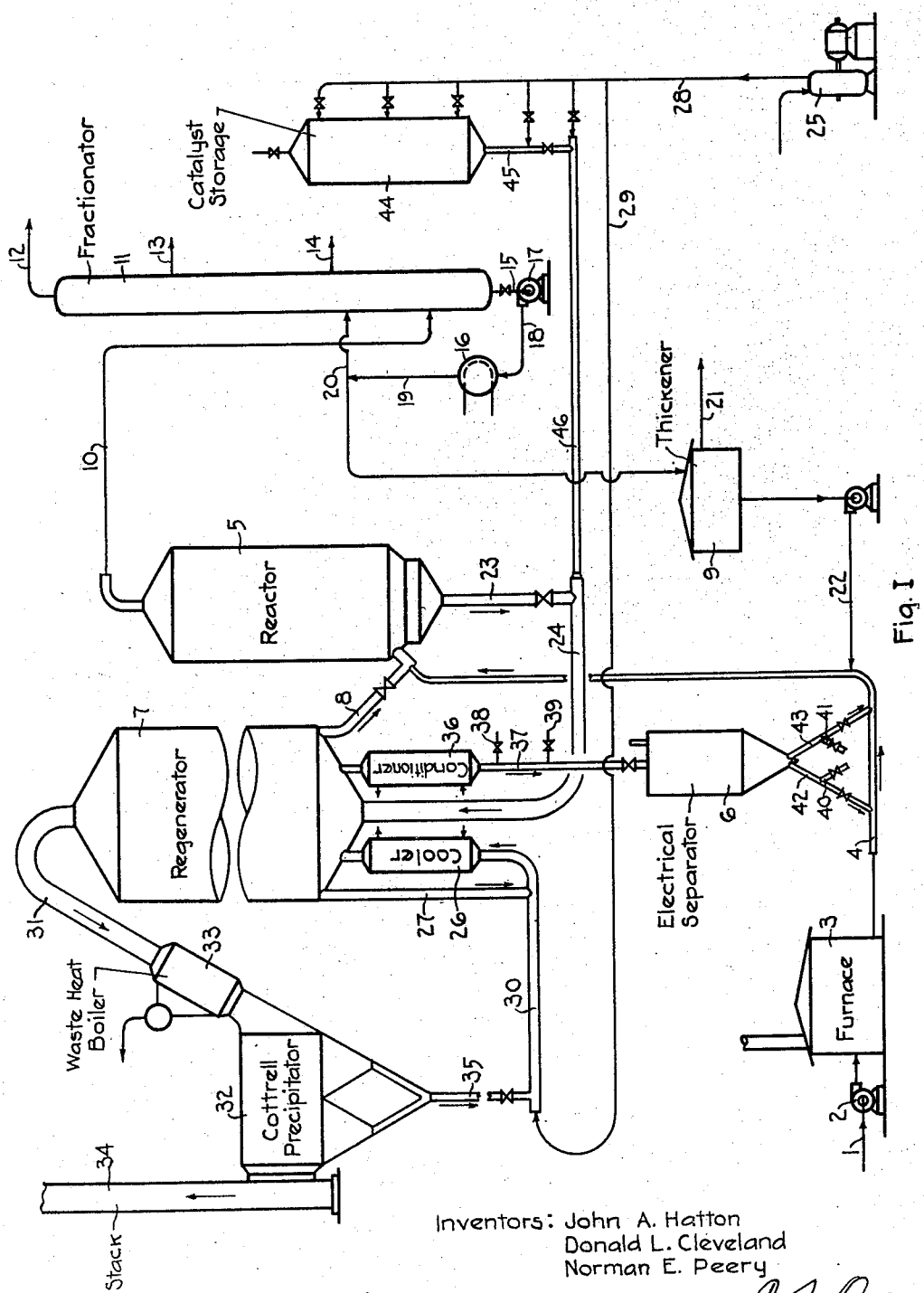
Fig. I
Inventors: John A. Hatton
Donald L. Cleveland
Norman E. Peery
By their Attorney: C. J. Ott

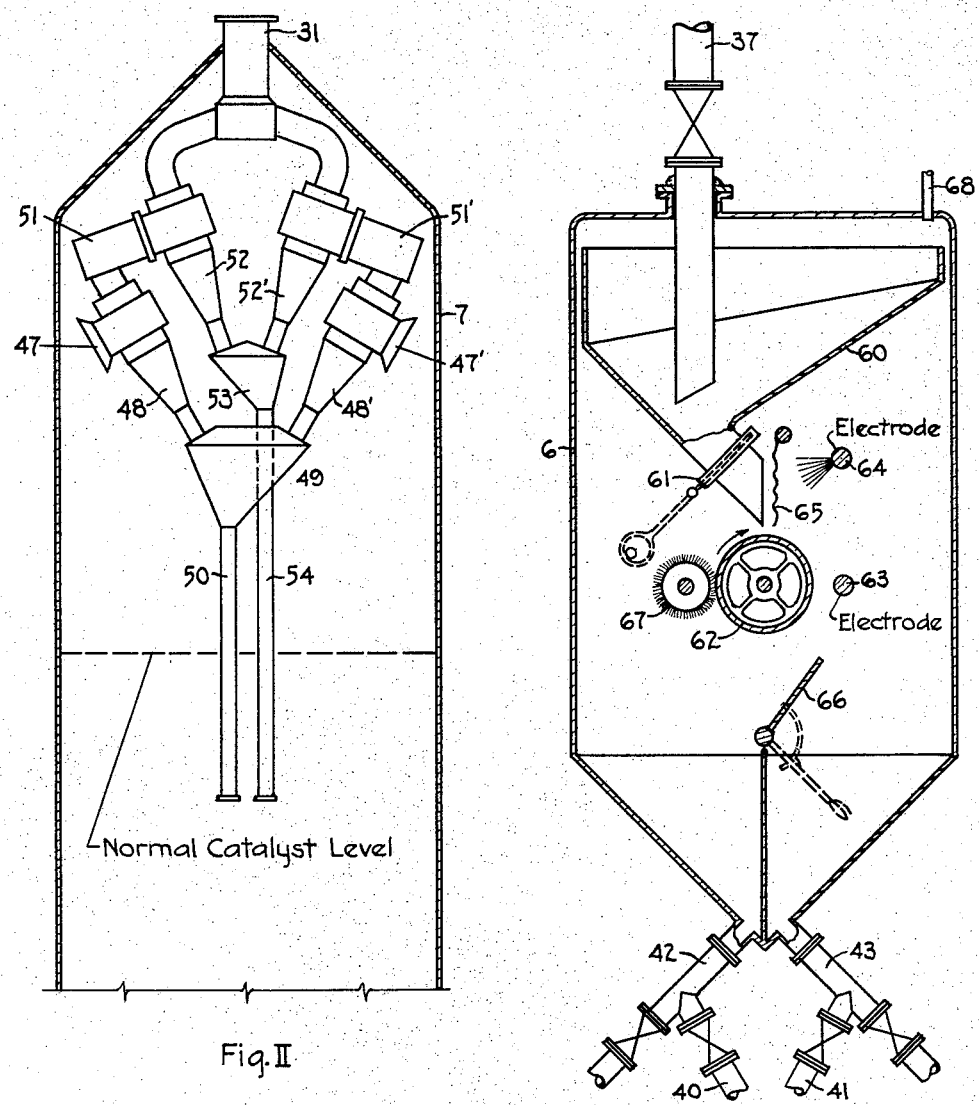

Patented Nov. 4, 1947

2,430,015

UNITED STATES PATENT OFFICE 2,430,015

UTILIZATION OF POWDERED CATALYSTS

John A. Hatton and Donald L. Cleveland, Long Beach, and Norman E. Peery, San Francisco, Calif., assignors to Shell Development Company, San Francisco, Calif., a corporation of Delaware Application August 21, 1945, Serial No. 611,868

11 Claims. (Cl. 196—52)

This invention relates to the use of powdered catalysts for effecting various treatments and catalytic conversions and relates more particularly to a method for maintaining an improved catalytic activity in such applications of powdered catalysts wherein the activity of the catalyst is maintained above a chosen minimum by the continuous or intermittent replacement of part of the catalyst by fresh catalyst. The process of the invention is applicable only in processes of the described type and is furthermore restricted to application in such processes where the catalyst is one having a microporous structure affording an available surface of at least about 50 square meters per gram. A particular aspect of the invention relates to an improvement in the so-called fluidized catalyst technique, particularly as applied to effecting hydrocarbon conversions such as the catalytic cracking of hydrocarbon oils.

It is well known that in the use of solid catalysts the amount of reaction and/or effectiveness of the catalyst depends largely upon the available catalytic surface in the reaction zone. Because of this fact, it has been the practice to prepare solid catalysts in a form affording a large available surface. The two common methods for accomplishing this are: (1) to prepare the catalyst in a form having a microporous structure as, for example, by partial leaching, partial dehydration of gels, and, (2) to put the catalytic agent on the surface of a carrier or supporting material having a microporous structure as, for example, by impregnating such materials as silica gel, activated alumina, activated carbon, etc., with the catalytic agent. For example, by well-known precipitation methods various metal oxide catalysts are produced with available surfaces in the order of 50 to 600 square meters per gram and by applying catalysts to such materials as silica gel and activated alumina, catalysts having available surfaces of this same order are produced. The available surface of these materials is nearly all inner surface, that is, surface provided by the microporous structure. The available surface, as this term is used herein, is measured or determined by the low temperature nitrogen adsorption method described by Emmett and Brunauer J. A. C. S. 59 1553 (1937).

These catalysts can be used in the form of pellets of suitable size disposed in a fixed or moving catalyst bed. However, in many cases it is much more desirable to use them in the form of a powder and many process techniques for the application of such catalyst powders have been described. The application of the catalyst in powdered form is particularly advantageous when the catalyst requires frequent regeneration and it is for this reason that the use of powdered catalyst has reached its highest state of development in the field of hydrocarbon conversions, such in particular as catalytic cracking.

One of the primary advantages of the use of the catalyst in a powdered state is that the catalyst in this form is most adapted for continuous operation. However, during use, the catalyst gradually declines in activity and in order to maintain a desired conversion level it is the practice to continuously or intermittently replace a portion of the catalyst with fresh catalyst. The catalyst is then a mixture of fresh and partially spent catalyst and the equilibrium activity is a function of the catalyst replacement rate. In order to provide for the catalyst replacement it is the practice to withdraw a portion of the equilibrium catalyst.

The object of the present invention is to provide a method whereby the equilibrium activity of the catalyst in such operations may be maintained at a higher level with a given catalyst replacement rate.

This object is accomplished according to the process of the invention by withdrawing for replacement a fraction of the catalyst which is below the equilibrium activity. The fraction of catalyst below equilibrium activity withdrawn according to the process of the invention is separated from a more or less representative portion of the equilibrium catalyst by making use of a difference in behavior noticed between the fresh and spent catalyst particles under the influence of a high potential electric field. It has been found that equilibrium catalyst can be separated into fractions of different activities by means of electrostatic separation methods. This finding is unexpected since such electrostatic separation methods are known to depend upon differences in the electrical properties of the components of the mixture, and in the present case the composition of the spent catalyst and the active catalyst is the same. While it is not desired to be bound by the correctness of any theory advanced to explain this unexpected behavior there is considerable evidence which indicates that the separation in the case of the equilibrium catalyst is based upon differences in the available surface areas of the more active and less active catalyst particles. It is found that catalysts having a microporous structure lose available surface upon use and that this loss of available surface is approximately proportional to the decline in activity of the catalyst. Thus, for example, in a typical case, silica-alumina catalysts such as presently used for catalytic cracking, have available surfaces in the order of 400–1000 square meters per gram when fresh, whereas the available surfaces are usually less than 100 square meters per gram when these catalysts are spent. The catalyst surface adsorbs small amounts of such materials as $H_2O$, $SO_2$, $H_2S$, $NH_3$, amines, etc., from the process gases and the presence of these adsorbed materials apparently alters the behavior of the particles in the electric field.

Thus, the process of the present invention in its broader aspect comprises continuously or intermittently removing a portion of the equilibrium catalyst from the system; separating said removed portion into two fractions by means of a high potential electric field; returning the fraction of high activity back to the system; discarding the fraction of low activity, and substituting for the discarded catalyst an approximately equal amount of fresh catalyst, thereby maintaining the catalytic activity of the main mass of catalyst at a desired equilibrium value. In a preferred embodiment of the invention loss of finely divided catalyst from the system with exit gas or vapor streams is retained as low as possible by adequate and efficient catalyst recovery means, and the withdrawal of catalyst from the system to provide for fresh catalyst replacement is effected by separating by means of an electric field a fraction having a lower activity and an average particle size equal to or somewhat larger than that of the equilibrium catalyst.

The outline of the process of the invention given in the preceding paragraph will be amplified in the following description of a typical operation of a preferred embodiment of the invention, namely the catalytic cracking of a hydrocarbon oil with a typical high-surface cracking catalyst. To assist in this description, reference is had to the attached drawings, wherein like or similar parts are designated by like reference numbers and wherein:

Figure I is a flow diagram of a modified fluid catalyst catalytic cracking plant in which the process of the invention may be conducted.

Figure II is a more or less diagrammatic vertical section of the upper part of the regenerator indicated in Figure I showing an arrangement of inner cyclone separators.

Figure III is a more or less diagrammatic vertical section of the electrical separator indicated in Figure I.

The drawings are not drawn to any absolute or relative scale and the dimensions and relative arrangement of the parts may be varied within reasonably wide ranges while still retaining the basic principles of operation contemplated.

Referring to the drawing, Figure I, the oil to be cracked, for instance gas oil, enters via line 1 and pump 2. This oil is preferably preheated, for example, to a temperature of 400–800° F., by means of a furnace 3 and then passed via line 4 to reactor 5. Minor amounts of catalyst are introduced into this oil stream from lines 22 and 40 or 41 as will be hereinafter described. Just prior to entering the reactor the oil feed is mixed with hot freshly regenerated catalyst from the regenerator standpipe 8. The amount of catalyst introduced into the oil in this type of cracking unit is usually between 6 and 30 parts by weight. In reactor 5 the oil contacts a bed of fluidized catalyst under conditions conducive to the desired conversion of the particular oil feed. In general, the conditions are about as follows:

| Pressure | Temperature | Liquid Hourly Space Velocity |
| --- | --- | --- |
| Atm. 0–10 | °F. 700–1100 | 0.4–6 |

The hydrocarbon vapors pass through internal cyclone separators (not shown) to remove the bulk of suspended catalyst particles and then pass out of the top of the reactor via line 10 to fractionator 11.

In fractionator 11 the product is separated into the desired fractions. Thus gasoline and gas may be removed overhead via line 12, light gas oil or naphtha may be removed via line 13, heavy gas oil may be removed via line 14, and a heavy oil may be removed from the bottom via line 15. This heavy oil may be passed through a cooler or waste heat boiler 16 and a part of it recycled back to the fractionator via pump 17 and lines 15, 18, 19 and 20 to quench or desuperheat the feed. This heavy oil sometimes contains some catalyst particles which escaped separation by the cyclone separators in reactor 5; in this case it is preferably passed through a thickener 9. Relatively clean oil is withdrawn via line 21 and the thickened slurry of catalyst is withdrawn via line 22 and recycled as described.

A portion of the catalyst in reactor 5 substantially equal to the amount of catalyst introduced with the feed is continuously withdrawn from the bottom through standpipe 23 into line 24. This catalyst is picked up by a stream of regeneration air from blower 25 and carried into regenerator 7. Regenerator 7, as illustrated, is a conventional down-flow fluid catalyst regenerator. The air stream passes up through the fluidized bed of catalyst in regenerator 7 burning combustible deposits from the catalyst.

A portion of hot regenerated catalyst is continuously withdrawn from the regenerator via standpipe 8 and introduced into the reactor as described.

In order to avoid overheating in the regeneration it is usually necessary to cool the catalyst and this is done by recycling a portion of the catalyst through cooler 26. Thus, catalyst is withdrawn via standpipe 27. This catalyst is picked up by a stream of air and carried through the recycle cooler 26 back up into the regenerator. The air stream is produced by blower 25 and flows via lines 28, 29 and 30.

The hot regeneration gases, after passing up through the catalyst bed, pass through internal cyclone separators to remove the bulk of the suspended catalyst particles and then pass out of the regenerator via line 31. A typical arrangement of internal cyclone separators is illustrated in Figure II. Referring to Figure II, the normal level of the fluidized catalyst in the regenerator 7 is indicated. Below this level the catalyst is present as a relatively dense pseudo liquid phase and above this level a small amount of catalyst is present as dust suspended in the gas stream. The gas stream enters ports 47 of Buell cyclone separators 48. Most of the suspended catalyst particles are separated and fall into a hopper 49 from where they flow by gravity down through a dip leg 50 which extends below the normal catalyst level into the fluidized bed of catalyst. The gases largely freed of catalyst particles pass via ducts 51 into second stage cyclone separators 52. Catalyst particles which are collected pass into hopper 53 and then via dip leg 54 back to the main catalyst mass. The gases substantially free of catalyst leave the regenerator via line 31. In many cases these two stages of cyclone separators are sufficient to prevent substantial loss of catalyst with the exit gases. However, in many cases, particularly where a very expensive and very finely divided catalyst is used, it is the practice to supplement the cyclone separators by a Cottrell-type precipitator. This is illlustrated in Figure I. Thus, the hot regeneration gas is cooled by passing it through a waste heat boiler 33 and then passed through Cottrell precipitator 32. This gas feed to the Cottrell precipitator carries in suspension a small amount of catalyst fines which escaped separation by the cyclone separators in the regenerator. The catalyst fines collected by the Cottrell precipitator are withdrawn via standpipe 35 and are carried by the air stream via line 30 back to the regenerator where they mix with the main mass of the catalyst.

In order to remove catalyst to provide for catalyst replacement, a portion of the regenerated catalyst is withdrawn from the regenerator through conditioner 36 and standpipe 37 to an electrical separator 6. In some cases the conditioner 36 may serve merely to cool the hot regenerated catalyst down to a temperature which is more suitable for the electrical separation. However, the efficiency of the electrical separation step may usually be appreciably increased by further conditioning the catalyst by careful control of the water content of the gas phase and especially by treating the catalyst with separate agents. Thus, a controlled amount of steam and air may be advantageously introduced into the standpipe 37 via line 38. Also, an electrolytic agent such as ammonia, vapors of amine or hydrogen fluoride may be introduced in controlled amounts via line 39. Such conditioning agents are adsorbed on the catalyst in proportion to the available catalyst surface and greatly increase the effect of the electrical field upon the particles having large available surfaces due to the fact that they have electrical properties quite different from those of the catalyst. Preferred conditioning agents are volatile and water-soluble electrolytes.

Separator 6 may be one of the conventional designs or may be specifically designed for the particular purpose. An arrangement of elements of one type of electrical separator is illustrated in Figure III. Referring to Figure III, 60 designates the feed hopper provided with a vibrating mechanical feeding screen 61. By means of this feeding mechanism the catalyst particles are fed in a more or less uniform layer onto the rotating electrically charged roll 62; 63 is a gas-tube electrode; 64 is a brush charging electrode; 65 is an insulating screen; 66 is the adjustable dividing plate; 67 is a brush for cleaning the roll; and 68 is a vent.

In separator 6 the catalyst particles are separated into two fractions according to their catalytic activity. The less active fraction is withdrawn via line 40 or 41. The more active fraction is fed via line 42 or 43 into line 4 and back to the reaction system as described. The alternative lines for withdrawal of less active and more active fractions of the catalyst from the separator are provided to allow for differences in the electrical properties of the catalysts and to allow for reversal of the polarities of the electrodes.

An amount of fresh catalyst approximately equivalent to the amount of spent catalyst withdrawn from the separator 6 is withdrawn into the system from catalyst storage vessel 44. This catalyst, which may be introduced intermittently or continuously, is withdrawn via standpipe 45 and introduced into the system via line 46 by the regeneration air.

It will be noted that in the system described there is no substantial removal of catalyst except that which is withdrawn through the electrical separator 6. The catalyst losses through the Cottrell precipitator are maintained at a minimum. It will also be noted that the material collected by the Cottrell precipitator is quite different from that treated in the electrical separator 6. Thus, the material collected by the Cottrell precipitator consists of very fine catalyst particles, whereas the material treated in the electrical separator 6 is a representative portion of the main catalyst mass which, if anything, has a slightly higher average particle size than the total catalyst because of the separation of at least a part of the catalyst fines.

The process of the invention is of general application to all catalyst systems wherein a finely divided catalyst having a large surface area is used and the effectiveness of the catalyst is maintained above a desired equilibrium level by the continuous or intermittent replacement of a minor portion of the main catalyst mass by fresh catalyst. Thus, the invention is applicable to liquid phase operation, vapor phase operation and mixed phase operation in both regenerative and non-regenerative processes. Preferred applications of the process are, however, in vapor phase operation with continuous or frequent regeneration of the catalyst since it is in such operations that the loss of available surface of various catalysts is more nearly proportional to the loss of catalytic activity.

As pointed out above, the process of the invention is restricted to application in such operations wherein the fresh catalyst is one having a large available surface. In general, the process is more efficient the higher the surface of the fresh catalyst. Examples of catalysts which are particularly suitable are the natural clay catalysts including those which have been made more active or selective by treatment or modification and the synthetic clay-type catalysts. A particular example of the former is the catalyst sold under the trade-name of Filtrol. The latter catalysts are synthetic high-surface materials consisting largely of silica and/or alumina and/or zirconia and/or magnesia often containing minor amounts of various promoter substances such as boric oxide, aluminum fluoride, aluminum phosphate and/or synthetic oxides or sulfides of heavy metals. These catalysts generally have available surfaces of at least 150 square meters per gram and usually above 400 square meters per gram. The process of the invention is, however, not limited to application with these clay-type catalysts since by adjustment of the polarities and/or electrical potential and/or the conditioning treatment a wide variety of other catalytic materials may be applied.

The catalyst is preferably relatively finely divided, i. e., passing at least a 6-mesh sieve, and should preferably consist largely of particles retained by a 200-mesh sieve. In such cases where a large part of the catalyst consists of particles passing a 200-mesh sieve, it is possible and advantageous to separate and treat in the electrical separation step only the larger particles. The catalyst particles do not need to be of uniform size. However, a relatively small range of particle size allows a more efficient separation to be made. Thus, in some cases it may be desirable to separate a fraction of a narrow size range by elutriation or sieving and then treat only this fraction in the electrical separation step.

Particularly suitable catalysts for use in the present process are the so-called MS catalysts. These catalysts are prepared as small substantially uniform spheres of almost any desired size. Suitable methods for the preparation of such catalysts are described in copending application, Serial No. 492,189, filed June 23, 1943. These catalysts may be employed in the process of the present invention in carrying out a wide variety of processes and treatments including conversions of inorganic materials as well as organic materials.

We claim as our invention:

1. In the application of a finely divided adsorptive solid catalyst which declines in activity and adsorptive ability in use, the method of maintaining a high activity in substantially continuous operation which comprises substantially continuously withdrawing a representative portion of the catalyst from the main mass of catalyst, separating said portion by an electrostatic separation treatment into two fractions having different specific surfaces, discarding the fraction having the lower specific surface, returning to the main catalyst mass the fraction having the higher specific surface, and adding to the main catalyst mass a portion of fresh catalyst substantially equivalent to said discarded fraction.

2. In the application of a finely divided adsorptive solid catalyst which declines in activity and adsorptive ability in use, the method of maintaining a high activity in substantially continuous operation which comprises substantially continuously withdrawing a representative portion of the catalyst from the main mass of catalyst, separating said portion into two fractions having different specific surfaces by means of a high potential electric field, discarding the fraction having the lower specific surface, returning to the main catalyst mass the fraction having the higher specific surface, and adding to the main catalyst mass a portion of fresh catalyst substantially equivalent to said discarded fraction.

3. Process according to claim 2 in which the representative portion of the catalyst separated into two fractions by means of a high potential electric field is conditioned to improve the efficiency in said separation by treatment with a volatile water-soluble electrolyte which is adsorbed by the catalyst particles.

4. Process according to claim 2 in which the representative portion of the catalyst separated into two fractions by means of a high potential electric field is conditioned to improve the efficiency in said separation by treatment with vapors of an amine.

5. Process according to claim 2 in which the representative portion of the catalyst separated into two fractions by means of a high potential electric field is conditioned to improve the efficiency in said separation by treatment with vapors of ammonia.

6. Process according to claim 2 in which the representative portion of the catalyst separated into two fractions by means of a high potential electric field is conditioned to improve the efficiency in said separation by treatment with vapors of hydrogen fluoride.

7. In the application of a finely divided adsorptive solid catalyst which declines in activity and adsorptive ability in use, the method of maintaining a high activity in substantially continuous operation which comprises substantially continuously withdrawing a representative portion of the catalyst from the main mass of catalyst, separating said withdrawn portion into two fractions in the presence of water vapor by means of a high potential electric field, discarding the fraction having the lower conductivity, returning the fraction having the higher conductivity to the main catalyst mass, and adding to the main catalyst mass a portion of fresh catalyst substantially equivalent to said discarded fraction.

8. In the application of a finely divided adsorptive solid cracking catalyst in the catalytic cracking of a hydrocarbon oil, the method of maintaining a high activity in substantially continuous operation which comprises substantially continuously withdrawing a representative portion of the catalyst from the main mass of catalyst, separating said portion by an electrostatic separation treatment into two fractions having different specific surfaces, discarding the fraction having the lower specific surface, returning to the main catalyst mass the fraction having the higher specific surface, and adding to the main catalyst mass a portion of fresh catalyst substantially equivalent to said discarded fraction.

9. In the application of a finely divided adsorptive siliceous catalyst which declines in activity and adsorptive ability in use, the method of maintaining a high activity in substantially continuous operation which comprises substantially continuously withdrawing a representative portion of the catalyst from the main mass of catalyst, separating said portion by an electrostatic separation treatment into two fractions having different specific surfaces, discarding the fraction having the lower specific surface, returning to the main catalyst mass the fraction having the higher specific surface, and adding to the main catalyst mass a portion of fresh catalyst substantially equivalent to said discarded fraction.

10. In the application of a finely divided adsorptive siliceous cracking catalyst in the catalytic cracking of a hydrocarbon oil, the method of maintaining a high activity in substantially continuous operation which comprises substantially continuously withdrawing a representative portion of the catalyst from the main mass of catalyst, separating said portion by an electrostatic separation treatment into two fractions having different specific surfaces, discarding the fraction having the lower specific surface, returning to the main catalyst mass the fraction having the higher specific surface, and adding to the main catalyst mass a portion of fresh catalyst substantially equivalent to said discarded fraction.

11. Process according to claim 10 in which the representative portion of catalyst withdrawn for treatment in said electrostatic separation step is a portion of at least partially regenerated catalyst.

JOHN A. HATTON.
DONALD L. CLEVELAND.
NORMAN E. PEERY.

REFERENCES CITED

The following references are of record in the file of this patent:

UNITED STATES PATENTS

| Number | Name | Date |
|---|---|---|
| 1,152,442 | Schniewing | Sept. 7, 1915 |
| 2,305,872 | Heinrich | Dec. 22, 1942 |
| 2,356,717 | Williams | Aug. 22, 1944 |